US011009597B2

(12) United States Patent
Farley et al.

(10) Patent No.: US 11,009,597 B2
(45) Date of Patent: May 18, 2021

(54) PHASE NOISE COMPENSATION IN DIGITAL BEAMFORMING RADAR SYSTEMS

(71) Applicant: Xilinx, Inc., San Jose, CA (US)

(72) Inventors: Brendan Farley, Donabate (IE); Christophe Erdmann, Dublin (IE); Bob W. Verbruggen, Saggart (IE)

(73) Assignee: Xilinx, Inc., San Jose, CA (US)

( * ) Notice: Subject to any disclaimer, the term of this patent is extended or adjusted under 35 U.S.C. 154(b) by 284 days.

(21) Appl. No.: 16/222,801

(22) Filed: Dec. 17, 2018

(65) Prior Publication Data

US 2020/0191937 A1    Jun. 18, 2020

(51) Int. Cl.
*G01S 13/50* (2006.01)
*G01S 13/90* (2006.01)
*G01S 13/58* (2006.01)

(52) U.S. Cl.
CPC .......... *G01S 13/505* (2013.01); *G01S 13/581* (2013.01); *G01S 13/904* (2019.05); *G01S 13/9047* (2019.05)

(58) Field of Classification Search
CPC ..... G01S 13/505; G01S 13/904; G01S 13/581
See application file for complete search history.

(56) References Cited

U.S. PATENT DOCUMENTS

| | | | | |
|---|---|---|---|---|
| 2003/0156658 | A1* | 8/2003 | Dartois | H03F 1/3294 375/297 |
| 2006/0274871 | A1* | 12/2006 | Griessbaum | G01S 7/288 375/354 |
| 2011/0122017 | A1* | 5/2011 | Vacanti | G01S 13/345 342/175 |
| 2011/0312279 | A1* | 12/2011 | Tsai | H04W 4/21 455/67.11 |
| 2013/0162465 | A1* | 6/2013 | Mukai | G01S 13/103 342/195 |
| 2018/0059232 | A1* | 3/2018 | Park | G01S 7/2923 |
| 2018/0074181 | A1* | 3/2018 | Kishigami | G01S 13/426 |
| 2018/0252807 | A1* | 9/2018 | Fox | G01S 13/904 |

OTHER PUBLICATIONS

Frankford et al., "Software-Defined Radar for MIMO and Adaptive Waveform Applications," Radar Conference, 2010 IEEE, IEEE Piscataway, NJ, USA, pp. 724-728, May 10, 2010.
Sang et al., "Micro Hand Gesture Recognition System Using Ultrasonic Active Sensing," Arxiv.org, Cornell University Library, 201 Olin Library, Cornell University, Ithaca, NY, p. 49341, Dec. 1, 2017.
Elo, Mark, "Phase noise and its changing role in radar design and test", Giga-tronics Inc, Aug. 10, 2012 4 pages, https://www.edn.com/design/test-and-measurement/4392156/Phase-noise-and-its-changing-role-in-radar-design-and-test.

* cited by examiner

*Primary Examiner* — Marcus E Windrich
(74) *Attorney, Agent, or Firm* — Paradice and Li LLP (57) ABSTRACT

A radar system includes a transmitter to transmit a sequence of pulses, a receiver to receive reflections of the transmitted pulses, and velocity detection circuitry to determine a velocity of an object in a path of the transmitted pulses based at least in part on the transmitted pulses and the reflected pulses. The transmitter includes a plurality of digital-to-analog converters (DACs) to generate the sequence of pulses in response to a clock signal. The receiver includes a plurality of analog-to-digital converters (ADCs) to sample the reflected pulses in response to the clock signal. Accordingly, the ADCs are locked in phase with the DACs.

16 Claims, 10 Drawing Sheets

PHASE NOISE COMPENSATION IN DIGITAL BEAMFORMING RADAR SYSTEMS

TECHNICAL FIELD

Aspects of the present disclosure generally relate to radar systems, and specifically to phase noise compensation in digital beamforming radar systems.

BACKGROUND

A radar system can be used to measure the distance and/or velocity of objects in its vicinity. The radar system operates by transmitting one or more modulated pulses. Any objects in the path of the pulses will reflect at least a portion of the transmitted pulses back to the radar. The radar system may determine the distance and/or velocity of the object(s) based on a timing at which the radar receives the reflected pulses. For example, radar pulses may take longer to reach (and return from) objects that are further away from the radar system compared to objects that are closer to the radar system. Thus, the radar system may determine the distance of an object based on a round-trip time (RTT) of pulses reflected from that object.

Doppler radar systems are typically used to measure the velocity of a moving object. For example, the Doppler radar operates by transmitting a series (or sequence) of pulses at a target frequency. The movements of an object in the path of the radar pulses will affect the frequency of the reflected pulses. For example, radar pulses reflected by an object moving in the direction of (e.g., towards) the radar system will exhibit a higher frequency (e.g., shorter duration between successive pulses) than the target frequency. On the other hand, radar pulses reflected by an object moving opposite the direction of (e.g., away from) the radar system will exhibit a lower frequency (e.g., longer duration between successive pulses) than the target frequency. The change in frequency, between the reflected pulses and the transmitted pulses (e.g., the target frequency), is typically referred to as a "Doppler shift." Thus, the Doppler radar system may determine the velocity of an object based on the amount of Doppler shift exhibited by the pulses reflected from that object.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure are directed to radar systems and methods of their operation. An example radar system includes a transmitter to transmit a sequence of pulses, a receiver to receive reflections of the transmitted pulses, and velocity detection circuitry to determine a velocity of a first object in a path of the transmitted pulses based at least in part on the transmitted pulses and the reflected pulses. The transmitter includes a plurality of digital-to-analog converters (DACs) to generate the sequence of pulses in response to a clock signal. The receiver includes a plurality of analog-to-digital converters (ADCs) to sample the reflected pulses in response to the clock signal.

In some implementations, the ADCs are locked in phase with the DACs. For example, at least one of the DACs may be configured to generate a first pulse in response to a first transition of the clock signal, and at least one of the ADCs may be configured to sample a reflection of the first pulse in response to the first transition of the clock signal.

The velocity detection circuitry may be further configured to detect a Doppler shift between a frequency of the transmitted pulses and a frequency of the reflected pulses and determine the velocity of the first object based at least in part on the Doppler shift. Phase noise in the clock signal may cause variations in the frequency of the transmitted pulses and corresponding variations in the frequency of the reflected pulses. Thus, in some aspects, the receiver matches the variations in the frequency of the reflected pulses to the variations in the frequency of the transmitted pulses when sampling the reflected pulses.

In some implementations, the reflected pulses may include reflections from a second object in the path of the transmitted pulses. Furthermore, the phase noise may cause the frequency of at least some of the reflected pulses from the second object to overlap the frequency of the reflected pulses from the first object. In some aspects, the first object may be a moving object and the second object may be stationary. Thus, the velocity detection circuitry may be further configured to filter the reflected pulses from the second object when detecting the Doppler shift.

In some implementations, the radar system may further include a clock generator circuit to generate the clock signal and a delay element to delay the clock signal provided to the ADCs. For example, the phase noise may be produced by one or more components of the clock generator circuit. In some aspects, the amount of delay implemented by the delay element may be based at least in part on a round-trip time between the transmission of a pulse and the reception of a reflection of the pulse.

An example method disclosed herein may be used to operate a radar system. The method may include generating a sequence of pulses via a plurality of digital-to-analog converters (DACs) in response to a clock signal; transmitting the sequence of pulses; sampling reflections of the transmitted pulses via a plurality of analog-to-digital converters (ADCs) in response to the clock signal; and determining a velocity of a first object in a path of the transmitted pulses based at least in part on the transmitted pulses and the reflected pulses.

In some implementations, the ADCs are locked in phase with the DACs. For example, at least one of the DACs may be configured to generate a first pulse in response to a first transition of the clock signal, and at least one of the ADCs may be configured to sample a reflection of the first pulse in response to the first transition of the clock signal.

In some aspects, the step of determining the velocity of the first object may further include steps of detecting a Doppler shift between a frequency of the transmitted pulses and a frequency of the reflected pulses; and determining the velocity of the first object based at least in part on the Doppler shift. Phase noise in the clock signal may cause variations in the frequency of the transmitted pulses and corresponding variations in the frequency of the reflected pulses. Thus, in some aspects, the sampling of the reflections may further include a step of matching the variations in the frequency of the reflected pulses to the variations in the frequency of the transmitted pulses.

In some implementations, the reflected pulses may include reflections from a second object in the path of the transmitted pulses. Furthermore, the phase noise may cause the frequency of at least some of the reflected pulses from the second object to overlap the frequency of the reflected pulses from the first object. In some aspects, the first object may be a moving object and the second object may be stationary. Thus, the step of determining the velocity of the first object may further include a step of filtering the reflected pulses from the second object when detecting the Doppler shift.

In some implementations, the method may further include steps of generating the clock signal via a clock generator circuit and delaying the clock signal provided to the ADCs. For example, the phase noise may be produced by one or more components of the clock generator circuit. In some aspects, the amount of delay implemented by the delay element may be based at least in part on a round-trip time between the transmission of a pulse and the reception of a reflection of the pulse.

BRIEF DESCRIPTION OF THE DRAWINGS

The example embodiments are illustrated by way of example and are not intended to be limited by the figures of the accompanying drawings. Like numbers reference like elements throughout the drawings and specification.

DETAILED DESCRIPTION

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature and/or details are set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

Figure 1A:
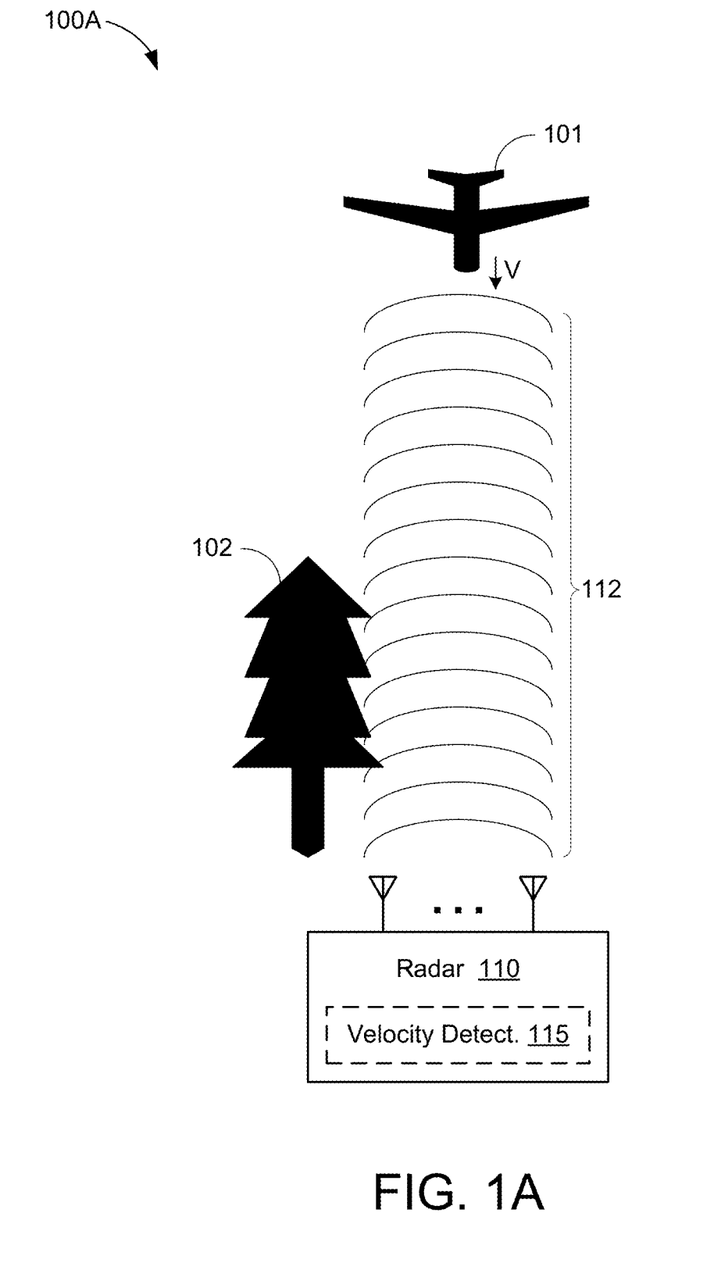
FIGS. 1A and 1B show an example radar sensing environment in which the present embodiment may be implemented.
Figure 1B:
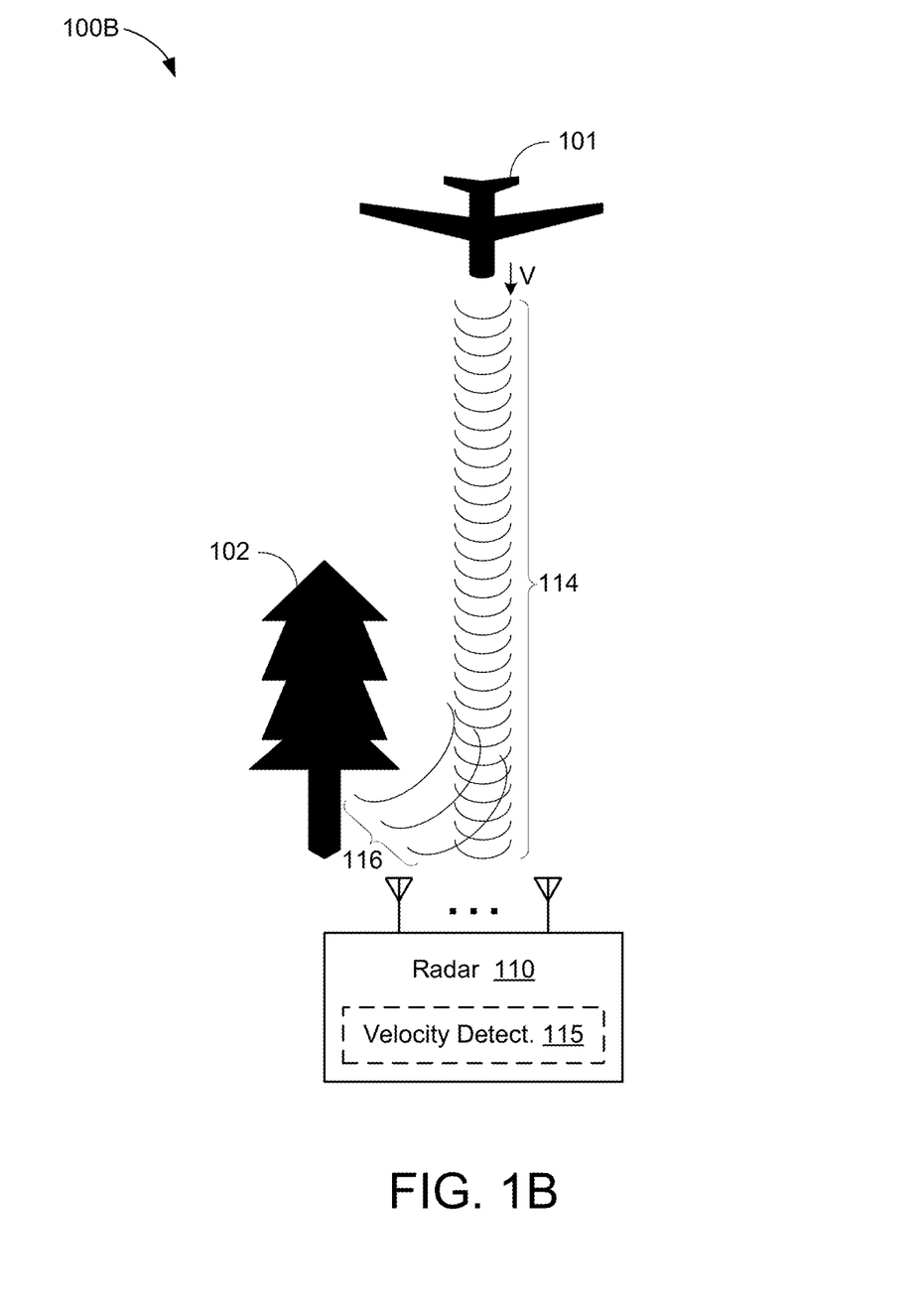

FIGS. 1A and 1B show an example radar sensing environment in which the present embodiment may be implemented. With reference for example to FIG. 1A, the environment 100A includes a first object 101, a second object 102, and a radar system 110. The radar system 110 may be configured to measure a distance and/or velocity of other objects (e.g., the first object 101 and the second object 102) in the environment 100A.

In some embodiments, the radar system 110 may transmit a sequence of pulses 112 (which may also be referred to herein as "radar pulses" or, collectively, as a "radar beam") in a direction of one or more objects in the environment 100A. For example, the radar pulses 112 may comprise a radio-frequency (RF) carrier signal having a predetermined pulse width ($\tau$) and pulse repetition frequency (PRF) corresponding to the number of pulses transmitted within a given duration of time. As shown in FIG. 1B, at least a portion of the transmitted pulses 112 may be reflected by the objects 101 and 102 and return to the radar system 110 as reflected pulses 114 and 116, respectively. Since electromagnetic signals propagate at the speed of light (c), the radar system 110 may determine the distance or range (R) of each of the objects 101 and 102 based on the round-trip time (RTT) between the transmission of a radar pulse and the reception of a corresponding reflection of that radar pulse:

$$R = \frac{RTT \cdot c}{2}$$

It is noted, from the equation above, that as the distance between the radar system 110 and an object changes, so too does the RTT between successive radar pulses reflected by that object. Thus, in some embodiments, the radar system 110 may include velocity detection circuitry 115 to measure the velocity of moving objects using Doppler sensing techniques. For example, the radar system 110 may transmit the sequence of pulses 112 at a predetermined "target" frequency ($f_T$). Radar pulses reflected by an object moving in the direction of (e.g., towards) the radar system 110 will exhibit a higher frequency (e.g., shorter duration between successive pulses) than the target frequency. On the other hand, radar pulses reflected by an object moving opposite the direction of (e.g., away from) the radar system 110 will exhibit a lower frequency (e.g., longer duration between successive pulses) than the target frequency. The change in frequency between the reflected pulses ($f_R$) and the transmitted pulses ($f_T$) is typically referred to as a "Doppler shift" ($f_D$). Thus, the velocity detection circuitry 115 may determine the velocity (v) of a moving object based on the amount of Doppler shift (e.g., $f_D = f_R - f_T$) exhibited by the pulses reflected from that object:

$$v = \frac{f_D \cdot c}{2 f_T}$$

In the example of FIG. 1B, the first object 101 is a moving object (e.g., airplane) traveling towards the radar system 110 at a velocity (V) and the second object 102 is a stationary object (e.g., tree). Thus, the reflected pulses 114 from the first object 101 may have a higher frequency (e.g., corresponding to a positive Doppler shift) than the frequency of the transmitted pulses 112 (e.g., $f_T$). However, because the second object 102 does not move, the reflected pulses 116 from the second object 102 may have the same frequency (e.g., no Doppler shift) as that of the transmitted pulses 112. It is noted that the power (P) or energy of the reflected pulses 114 and 116 may depend on the distance, size, and/or shape of the reflecting object. For example, as shown in FIG. 1B, the first object 101 is much further from the radar system 110 than the second object 102. Accordingly, the reflected pulses 114 from the first object 101 may have significantly less power than the reflected pulses 116 from the second object 102. More generally, the received power ($P_{RX}$) may be expressed as a function of the transmit power ($P_{TX}$), the antenna gain (G) of the radar system 110, the wavelength ($\lambda$) of the transmitted pulses 112, the radar cross-section ($\sigma_t$) and distance (R) of the reflecting object, and any external or internal losses ($L_s$):

$$P_{RX} = P_{TX}\left(\frac{G^2 \cdot \lambda^2 \cdot \sigma_t}{(4\pi)^3 \cdot R^4 L_s}\right)$$

It is noted, from the equation above, that the loss of power in the received (reflected) radar pulses varies exponentially with respect to the distance between radar system 110 and the target object $$\left(P_{RX} \sim \frac{1}{R^4}\right).$$

Thus, to maximize the power in the reflected pulses, the radar system 110 may use beamforming techniques to focus the transmitted pulses 112 in a particular direction (such as the direction of a target object). For example, the radar system 110 may include a plurality of antennas (e.g., an antenna array) each configured to transmit the same radar pulse with a different phase offset. As a result, the pulses transmitted by the various antennas may combine (e.g., for increased power) along the intended path and may cancel one another outside the intended path. In some embodiments, the radar system 110 may be configured to transmit the radar pulses 112 using analog beamforming techniques (e.g., phase shifts are applied to individual pulses in the analog domain). In some other embodiments, the radar system 110 may be configured to transmit the radar pulses 112 using digital beamforming techniques (e.g., phase shifts are applied to individual pulses in the digital domain).

Figure 2:
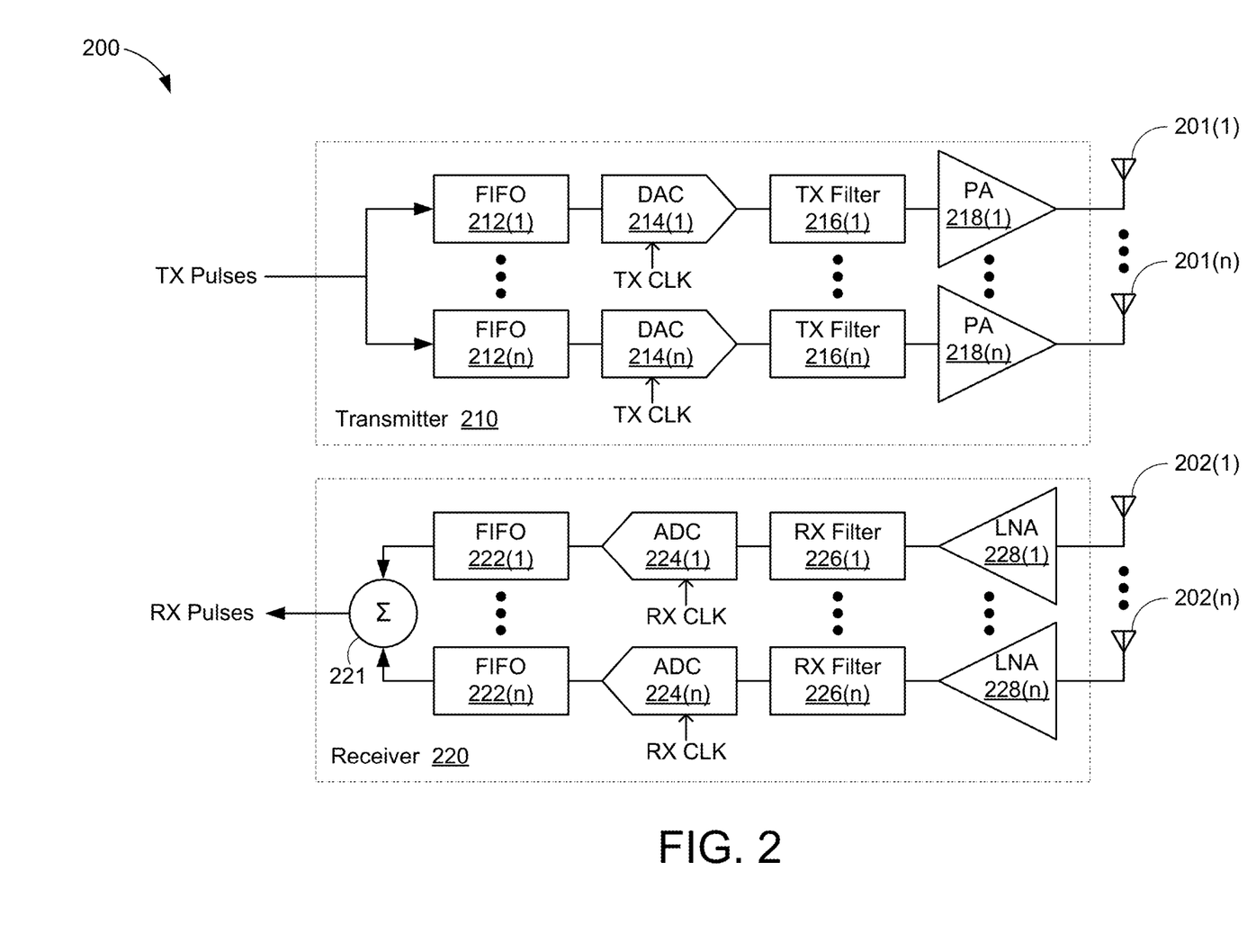
FIG. 2 is a block diagram of an example analog front-end (AFE) for a radar system.

FIG. 2 is a block diagram of an example analog front-end (AFE) 200 for a radar system. The AFE 200 may be implemented in a Doppler radar system, such as the radar system 110 of FIG. 1, to transmit and receive radar pulses that may be used to detect a speed or velocity of objects in the surrounding environment. More specifically, the AFE 200 includes a transmitter 210 to transmit the radar pulses and a receiver 220 to receive reflections of the radar pulses. In some embodiments, the AFE 200 is configured to transmit and receive the radar pulses using digital beamforming techniques.

The transmitter 210 receives a digital representation of outgoing (TX) pulses and transmits the TX pulses, via a plurality of TX antennas 201(1)-201(n), in a target direction (e.g., in a direction of a target object). In some implementations, the transmitter 210 may include a plurality of first-in first-out (FIFO) buffers 212(1)-212(n), a plurality of digital-to-analog converters (DACs) 214(1)-214(n), a plurality of TX filters 216(1)-216(n), and a plurality of power amplifiers (PAs) 218(1)-218(n) each coupled to a respective one of the TX antennas 201(1)-201(n). Each of the FIFOs 212(1)-212(n) may apply a respective phase shift (e.g., digital delay) to the TX pulses so that the analog pulses transmitted by the antennas 201(1)-201(n) will be steered or focused in the target direction. The DACs 214(1)-214(n) may convert the digital outputs of the FIFOs 212(1)-212(n), respectively, to a plurality of phase-shifted analog pulses which are filtered by the TX filters 216(1)-216(n). The phase-shifted analog pulses are amplified by the PAs 218(1)-218(n) and subsequently transmitted via the TX antennas 201(1)-201(n).

The receiver 220 may receive reflections of the transmitted pulses (e.g., transmitted by the transmitter 210), via a plurality of RX antennas 202(1)-202(n), and recovers a digital representation of the reflected (RX) pulses. In the example of FIG. 2, the RX antennas 202(1)-202(n) are shown to be separate from the TX antennas 201(1)-201(n). However, in some embodiments, the transmitter 210 and receiver 220 may share one or more antennas, for example, via antenna switching circuitry (not shown for simplicity). In some implementations, the transmitter 210 may include a plurality of FIFO buffers 222(1)-222(n), a plurality of analog-to-digital converters (ADCs) 224(1)-224(n), a plurality of RX filters 226(1)-226(n), and a plurality of low-noise amplifiers (LNAs) 228(1)-228(n) each coupled to a respective one of the RX antennas 202(1)-202(n). The LNAs 228(1)-228(n) may amplify the analog pulses received via the RX antennas 202(1)-202(n), respectively. The amplified pulses may be filtered by the RX filters 226(1)-226(n) and converted to digital format via the ADCs 224(1)-224(n). Each of the FIFOs 222(1)-222(n) may apply a respective phase shift (e.g., digital delay) to the outputs of the ADCs 224(1)-224(n), respectively, to align the phases of the digital pulses (e.g., to counter the effects of beamforming). The phase-aligned digital pulses may then be combined or summed together (e.g., via a summation circuit 221) to recover the corresponding RX pulses.

When the AFE 200 is implemented in a Doppler radar system, the transmitter 210 may receive a digital bitstream corresponding to a series of TX pulses to be transmitted, in succession, at a predetermined (e.g., target) frequency. Accordingly, the receiver 220 may receive a corresponding series of reflected pulses (e.g., to be converted to RX pulses) from one or more objects in the path of the transmitted pulses. As described above, a processing system coupled to the AFE 200 (such as the velocity detection circuitry 115 of FIGS. 1A and 1B) may determine the velocity of the objects based at least in part on a frequency of the RX pulses. More specifically, the velocity of an object may be determined by an amount of Doppler shift detected in the frequency of the RX pulses reflected by that object (e.g., relative to the frequency of the TX pulses). As described in greater detail below, to accurately detect such Doppler shifts, the RX pulses should be correlated (e.g., matched in phase) with the TX pulses.

It is noted, in the example of FIG. 2, that the DACs 214(1)-214(n) sample or generate analog pulses in response to a TX clock signal (CLK). More specifically, each of the DACs 214(1)-214(n) may update the amplitude of its analog output (e.g., corresponding to the TX pulses) with each transition of the TX CLK (e.g., from low-to-high or highto-low, or both). On the other hand, the ADCs 224(1)-224(n) sample the reflections of the analog pulses in response to an RX CLK. More specifically, each of the ADCs 224(1)-224(n) may update the amplitude of its digital output (e.g., corresponding to the RX pulses) with each transition of the RX CLK (e.g., from low-to-high or high-to-low, or both). In conventional radar systems, the TX CLK is provided by a local clock generator (not shown) residing on the transmitter 210 and the RX CLK is provided by a different clock generator (not shown) residing on the receiver 220.

Figure 3:
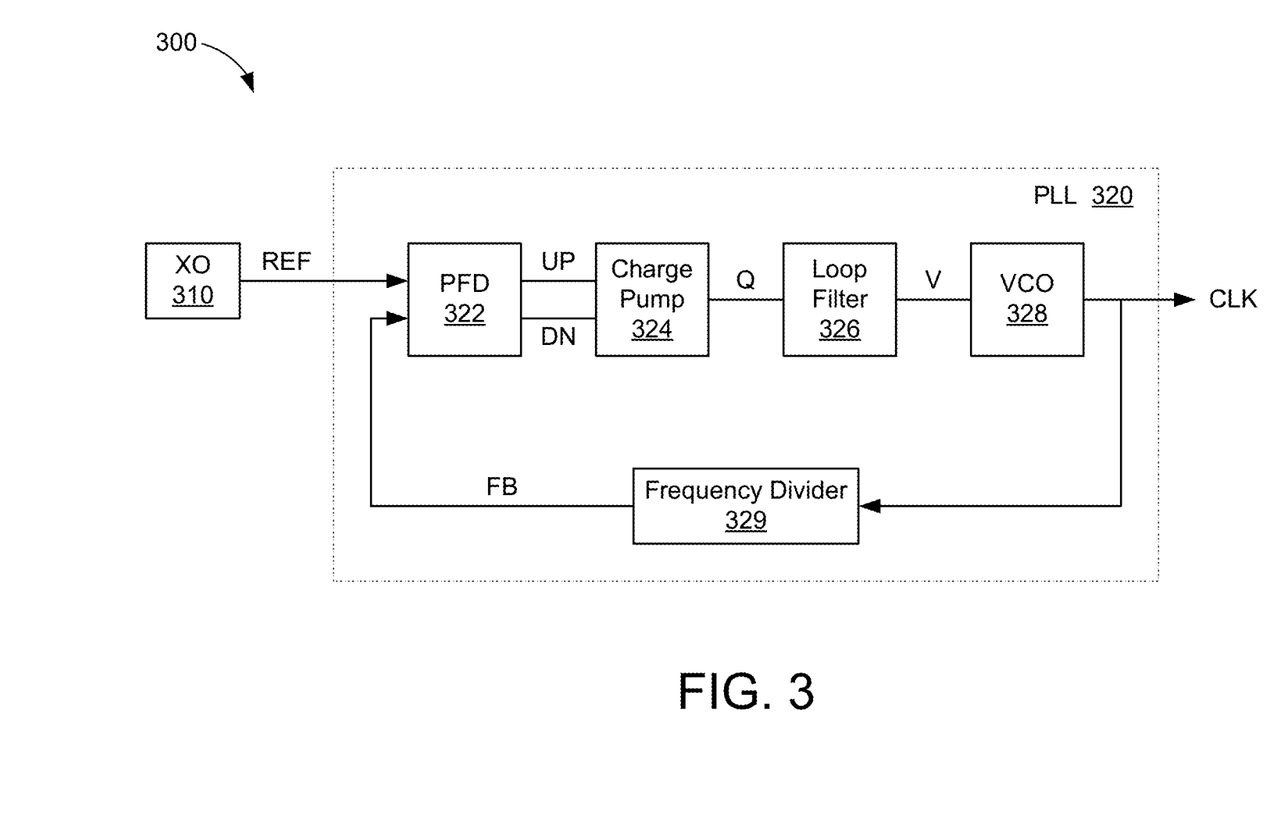
FIG. 3 is a block diagram of an example clock generator.

FIG. 3 is a block diagram of an example clock generator 300. For example, the clock generator 300 may be used to generate the TX CLK and/or the RX CLK for the AFE 200 of FIG. 2. The clock generator 300 includes a crystal oscillator (XO) 310 and a phase-locked loop (PLL) circuit 320. The crystal oscillator 310 typically includes a piezoelectric material (such as a crystal) that resonates at a precise frequency (e.g., the resonance frequency of the crystal) when a voltage is applied across the material. The mechanical oscillations of the crystal produce a very precise sinusoidal waveform which can be used a reference (REF) signal for the PLL 320. The PLL 320 receives the REF signal from the crystal oscillator 310 and produces a clock (CLK) signal based at least in part on the REF signal. More specifically, the PLL 320 may produce a CLK signal that is locked in phase with the REF signal. However, the frequency of oscillation of the CLK signal may be different than the frequency of oscillation of the REF signal. For example, in some aspects, the CLK signal may have a higher frequency of oscillation than the REF signal.

The PLL circuit 320 includes a phase and frequency detector (PFD) 322, a charge pump 324, a loop filter 326, a voltage-controlled oscillator (VCO) 328, and a frequency divider 329. The PFD 322 compares the phases of the REF signal with a feedback (FB) signal to generate "up" (UP) and "down" (DN) control signals. The charge pump 324 converts the UP and DN control signals to a charge (Q) that is proportional to the phase difference of REF and FB signals. The charge Q is filtered (e.g., integrated) by the loop filter 326 and provided as a control voltage (V) to the VCO 328. The VCO 328 outputs the CLK signal at a frequency of oscillation based on the control voltage V. The CLK signal is further provided to the frequency divider 329 (e.g., to scale the frequency of the CLK signal to that of the REF signal) and fed back to the PFD 322 as the FB signal.

The CLK signal may be used by an AFE, such as the AFE 200 of FIG. 2, to time the transmission of radar pulses. For example, in some aspects, the CLK signal may be provided to the DACs 214(1)-214(n) (e.g., as the TX CLK) to control the sampling times of the TX pulses. Thus, the timing (e.g., phases) of the analog pulses output by the DACs 214(1)-214(n) may depend, at least in part, on the frequency of the CLK signal (e.g., the timing between rising- or falling-edge transitions of the CLK signal). It is noted, however, that one or more components of the clock generator 300 may introduce jitter or phase noise (e.g., random phase fluctuations) into the CLK signal. For example, although the crystal oscillator 310 may produce a fairly stable REF signal, even the slightest fluctuations in the phase of the REF signal may contribute to "close-in" phase noise (e.g., relatively small frequency variations) in the transmitted pulses. Changes in temperature and other variations in the operating conditions of the VCO 328 and/or PLL 320 may cause further variations in the frequency of the CLK signal.

As described above, in conventional radar systems, the transmitter and receiver of an AFE typically receive their CLK signals from different clock generators. For example, if the clock generator 300 were to reside locally on the transmitter 210 of the AFE 200 (e.g., to provide the TX CLK), then a different clock generator would typically reside on the receiver 220 (e.g., to provide the RX CLK). However, when the TX CLK and RX CLK are generated from different sources, phase noise in either of the clock signals may affect the accuracy with which the RX pulses can be mapped to the TX pulses. Specifically, too much phase noise in the TX CLK or the RX CLK may cause the TX pulses and the RX pulses to become uncorrelated. This, in turn, may affect the ability of the radar system to detect or distinguish a Doppler shift in the RX pulses reflected by a moving object (e.g., compared to RX pulses reflected by a stationary object).

Figure 4:
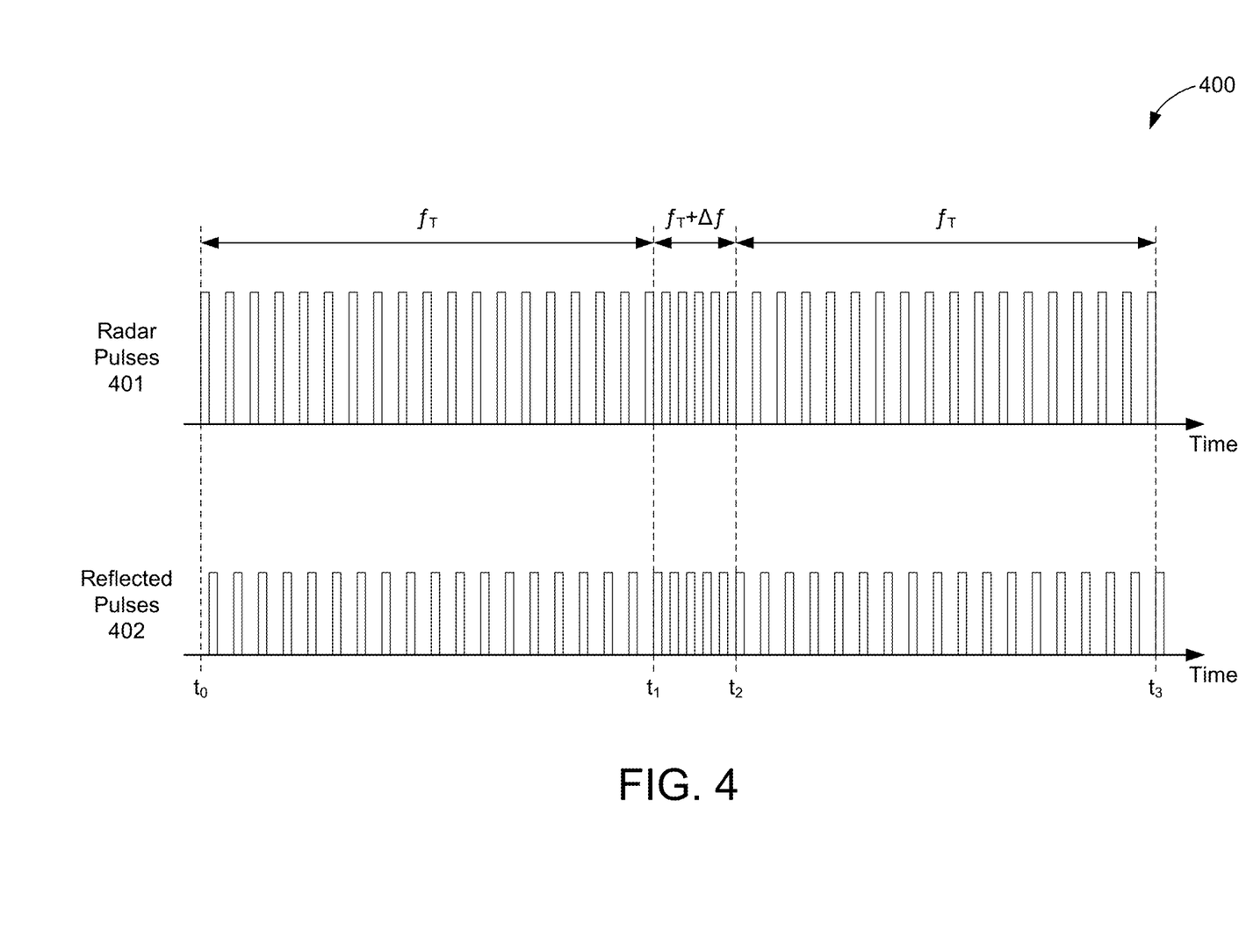
FIG. 4 is a timing diagram depicting an example sequence of radar pulses that may be transmitted and received by a Doppler radar system.

FIG. 4 is a timing diagram depicting an example sequence of radar pulses that may be transmitted and received by a Doppler radar system. With reference for example to FIG. 2, the radar pulses 401 may correspond to the analog pulses transmitted via the antennas 201(1)-201(n) and reflected pulses 402 may correspond to reflections of such analog pulses incident on the antennas 202(1)-202(n). More specifically, each of the reflected pulses 402 may be a reflection of a respective one of the radar pulses 401. For example, the reflected pulse 402 received immediately after time to may be a reflection of the radar pulse 401 transmitted at time to, and each successive reflected pulse 402 received thereafter may be a reflection of a corresponding radar pulse 401 transmitted just prior. It is noted that the amplitudes (e.g., power) of the reflected pulses 402 are substantially less than the amplitudes of the corresponding radar pulses 401.

The radar pulses 401 are generally transmitted at a target frequency $f_T$ from times $t_0$ to $t_3$. The reflected pulses 402 generally arrive at the receiver 220 at the target frequency $f_T$, from times $t_0$ to $t_3$, as well. Since the frequency of the reflected pulses 402 is substantially equal to the frequency of the radar pulses 401 (e.g., no Doppler shift), the reflected pulses 402 received between times $t_0$ and $t_3$ may be reflected by a stationary object (e.g., the second object 102 of FIG. 1). In the example of FIG. 4, phase noise in the TX CLK causes variations in the timing of successive radar pulses 401 transmitted between times $t_1$ and $t_2$. This results in a corresponding change or variation ($\Delta f$) in the frequency of the radar pulses 401 between times $t_1$ to $t_2$. More specifically, the phase noise in the TX CLK, between times $t_1$ and $t_2$, causes the radar pulses 401 to be transmitted at a higher frequency ($f_T+\Delta f$) than the target frequency from times $t_1$ and $t_2$. As a result, the reflected pulses 402 from the stationary object are also reflected back at this higher frequency ($f_T+\Delta f$) between times $t_1$ and $t_2$.

It is noted that the variations in the frequency of the reflected pulses 402 (and the radar pulses 401) may hinder the ability of the radar system to measure and/or detect Doppler shifts in the frequency of reflected pulses from moving objects. For example, in some instances, the frequencies of the reflected pulses 402 from a stationary object may overlap or coincide with the frequency of reflected pulses from a moving object (e.g., Doppler frequency). Moreover, when the radar system is closer to the stationary object than to the moving object, the amplitude of the reflected pulses 402 from the stationary object will be substantially greater than the amplitude of the reflected pulses from the moving object. As a result, the energy in the reflected pulses 402 from the stationary object may "swamp" (e.g., overwhelm) the receiver.

Figure 5:
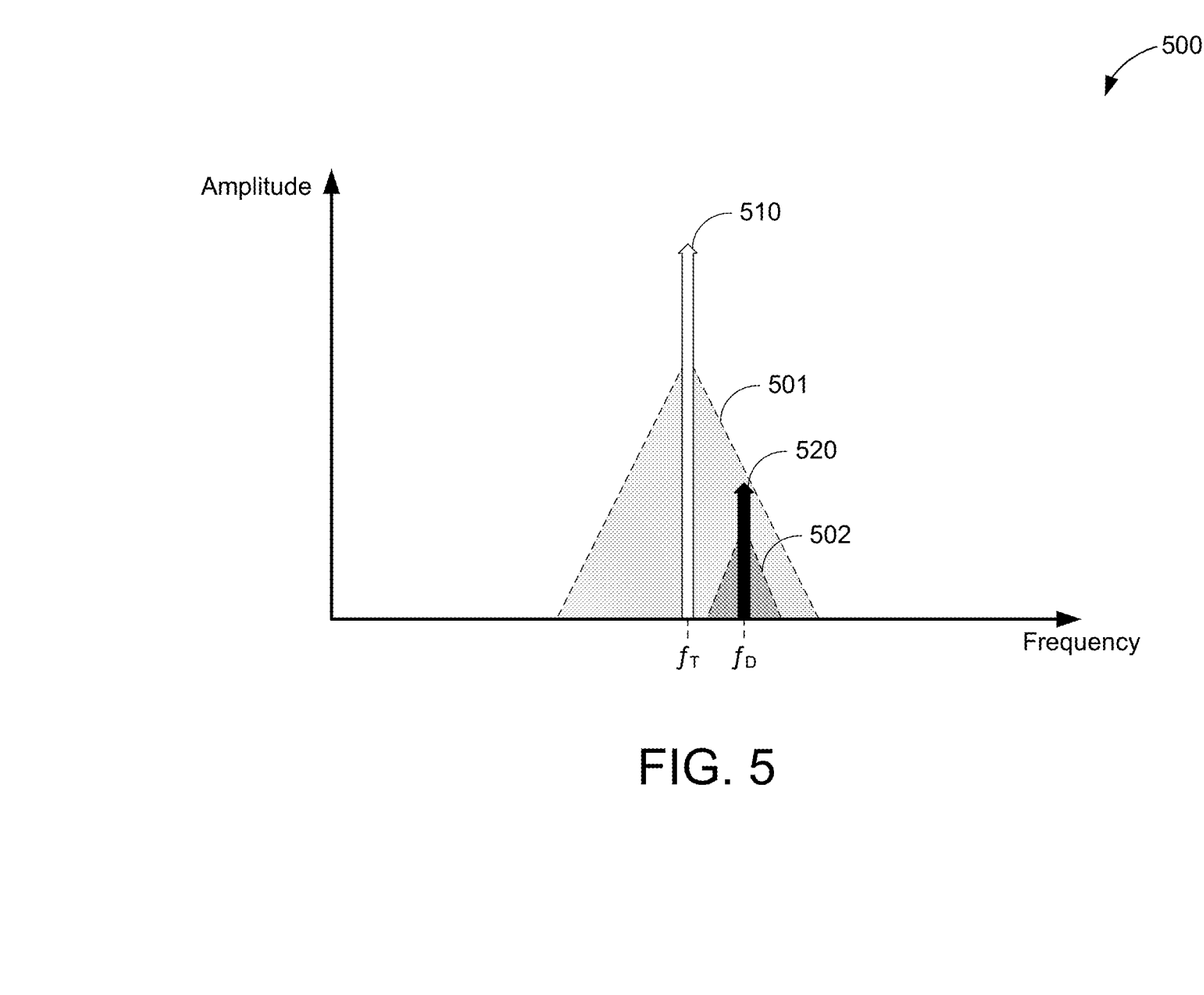
FIG. 5 is a frequency diagram depicting an example frequency-domain representation of a sequence of reflected pulses that may be received by a Doppler radar system.

FIG. 5 is a frequency diagram 500 depicting an example frequency-domain representation of a sequence of reflected pulses that may be received by a Doppler radar system. With reference for example to FIGS. 1A and 1B, the frequency diagram 500 may depict the frequencies of reflected pulses 114 and 116 from the first object 101 and the second object 102, respectively.

In the example of FIG. 5, the frequencies of the reflected pulses are generally distributed into two frequency bins 510 and 520. The first frequency bin 510 is centered at the target frequency $f_T$ (e.g., the frequency at which the radar pulses 112 are transmitted by the radar system 110) and the second frequency bin 520 is centered at a Doppler frequency $f_D$ that is slightly higher than the target frequency $f_T$. As described above, the first object 101 may be a moving object and the second object 102 may be stationary. Thus, the first frequency bin 510 may include the reflected pulses 116 from the second object 102 and the second frequency bin 520 may include the reflected pulses 114 from the first object 101.

Phase noise in the TX CLK may cause variations in the frequency of the transmitted pulses 112, thus causing variations in the frequencies of the reflected pulses 114 and 116. For example, the variations in the frequency of the reflected pulses 116 from the stationary object 102 are depicted by a skirt 501 around the first frequency bin 510. Furthermore, the variations in the frequency of the reflected pulses 114 from the moving object 101 are depicted by a skirt 502 around the second frequency bin 520. As shown in FIGS. 1A and 1B, the distance between the radar system 110 and the second object 102 is significantly shorter than the distance between the radar system 110 and the first object 101. Thus, the amplitude of the reflected pulses in the first frequency bin 510 is significantly greater than the amplitude of the reflected pulses in the second frequency bin 520.

As shown in FIG. 5, due to the phase noise in the TX CLK, the energy in the reflected pulses 116 from the stationary object 102 is greater than the energy in the reflected pulses 114 from the moving object 101 at the Doppler frequency $f_D$ (e.g., the energy in the second frequency bin 520 is swamped by the energy from the phase noise, for example, in the skirt 501). As a result, conventional radar systems may be unable to detect the Doppler frequency $f_D$ of the reflected pulses 114 from the moving object 101 or distinguish the Doppler frequency $f_D$ from the phase noise in the reflected pulses 116 from the stationary object 102. Conventional techniques for mitigating phase noise in the radar pulses have focused on suppressing the phase noise in the TX CLK (e.g., by implementing a more stable crystal oscillator 310 and/or regulating the temperature and voltage supply of the PLL 320 within the clock generator 300 of FIG. 3). However, as described above, even the slightest variations in the reference clock (REF) signal may contribute to close-in phase noise in the reflected pulses 116, which may swamp the Doppler frequency $f_D$ of the reflected pulses 114 since the Doppler shift tends to be very small relative to the frequency of the radar pulses $f_T$ (e.g., $|f_T-f_D| \ll f_T$).

Aspects of the present disclosure recognize that, by correlating (e.g., matching) the phase noise in the TX CLK with the phase noise in the RX CLK, the close-in phase noise in the reflected pulses 114 and 116 can be mitigated (e.g., rather than suppressed) in the receiver of the radar system 110. For example, referring back to FIG. 4, the phase noise in the TX CLK causes a change ($\Delta f$) in the frequency of the radar pulses 401 transmitted between times $t_1$ and $t_2$. This change in frequency may be attributed to a sudden increase the frequency of the TX CLK during the same time period. For example, assuming the TX CLK generally operates at a frequency equal to $2f_T$ (e.g., between times $t_0$ and $t_1$ and times $t_2$ and $t_3$), the phase noise between times $t_1$ and $t_2$ may cause the TX CLK to effectively operate at a frequency equal to $2f_T+\Delta f$, causing the DACs in the transmitter (e.g., DACs 214(1)-214(n) of FIG. 2) to sample the TX pulses at a faster rate.

With reference for example to FIG. 2, by synchronizing the phase noise of the RX CLK with the phase noise of the TX CLK, the reflected pulses 402 will also be sampled at the higher frequency (e.g., $2f_T-\Delta f$) between times $t_1$ and $t_2$. As a result, the phases of the radar pulses 401 generated by the DACs will be correlated (e.g., matched) with the phases of the reflected pulses 402 sampled by the ADCs (e.g., ADCs 224(1)-224(n) of FIG. 2) such that the radar system effectively detects no change in the frequency of the reflected pulses 402 received between times $t_1$ and $t_2$. In other words, to the radar system, the reflected pulses 402 will appear to be received at the target frequency $f_T$ for the entire duration from times $t_0$ to $t_3$ (e.g., even between times $t_1$ and $t_2$).

Figure 6:
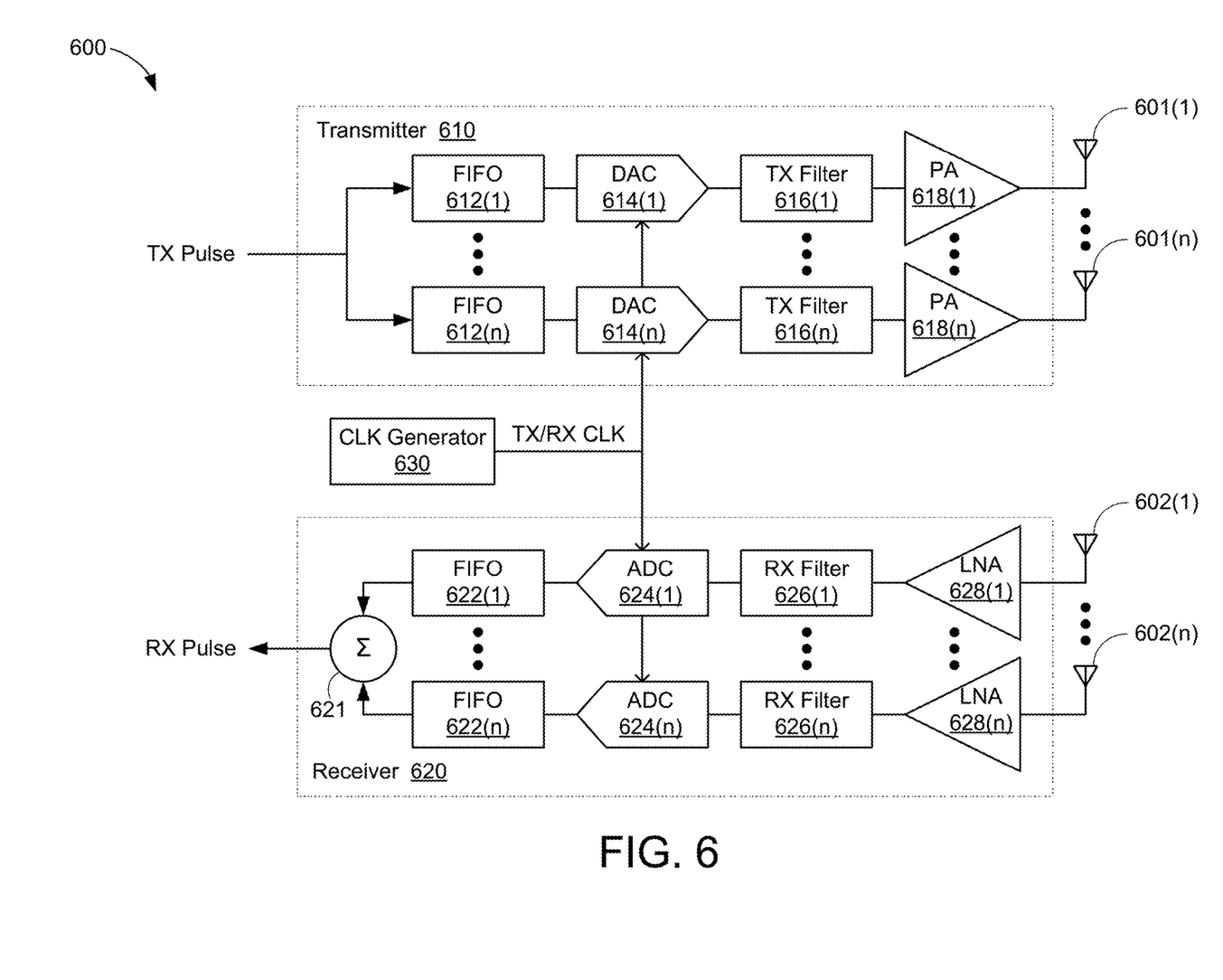
FIG. 6 is a block diagram of a phase-matched Doppler radar AFE, in accordance with some embodiments.

FIG. 6 is a block diagram of a phase-matched Doppler radar AFE 600, in accordance with some embodiments. The AFE 600 may be implemented in a Doppler radar system, such as the radar system 110 of FIG. 1, to transmit and receive radar pulses that may be used to detect a speed or velocity of objects in the surrounding environment. More specifically, the AFE 600 may be an example embodiment of the AFE 200 of FIG. 2. The AFE 600 includes a transmitter 610 to transmit the radar pulses and a receiver 620 to receive reflections of the radar pulses. In some embodiments, the AFE 600 is configured to transmit and receive the radar pulses using digital beamforming techniques.

The transmitter 610 receives a digital representation of a series of TX pulses and transmits the TX pulses, via a plurality of TX antennas 601(1)-601(n), in a target direction (e.g., in a direction of a target object). In some implementations, the transmitter 610 may include a plurality of FIFOs 612(1)-612(n), a DACs 614(1)-614(n), a plurality of TX filters 616(1)-616(n), and a plurality of PAs 618(1)-618(n) each coupled to a respective one of the TX antennas 601(1)-601(n). Each of the FIFOs 612(1)-612(n) may apply a respective phase shift (e.g., digital delay) to the TX pulses so that the analog pulses transmitted by the antennas 601(1)-601(n) will be steered or focused in the target direction. The DACs 614(1)-614(n) may convert the digital outputs of the FIFOs 612(1)-612(n), respectively, to a plurality of phase-shifted analog pulses which are filtered by the TX filters 616(1)-616(n). The phase-shifted analog pulses are amplified by the PAs 618(1)-618(n) and subsequently transmitted via the TX antennas 601(1)-601(n).

The receiver 620 may receive reflections of the transmitted pulses (e.g., transmitted by the transmitter 610), via a plurality of RX antennas 602(1)-602(n), and recovers a digital representation of the reflected (RX) pulses. In the example of FIG. 6, the RX antennas 602(1)-602(n) are shown to be separate from the TX antennas 601(1)-601(n). However, in some embodiments, the transmitter 610 and receiver 620 may share one or more antennas, for example, via antenna switching circuitry (not shown for simplicity). In some implementations, the transmitter 610 may include a plurality of FIFO buffers 622(1)-622(n), a plurality of ADCs 624(1)-624(n), a plurality of RX filters 626(1)-626(n), and a plurality of LNAs 628(1)-628(n) each coupled to a respective one of the RX antennas 602(1)-602(n). The LNAs 628(1)-628(n) may amplify the analog pulses received via the RX antennas 602(1)-602(n), respectively. The amplified pulses may be filtered by the RX filters 626(1)-626(n) and converted to digital format via the ADCs 624(1)-624(n). Each of the FIFOs 622(1)-622(n) may apply a respective phase shift (e.g., digital delay) to the outputs of the ADCs 624(1)-624(n), respectively, to align the phases of the digital pulses (e.g., to counter the effects of beamforming). The phase-aligned digital pulses may then be combined or summed together (e.g., via a summation circuit 621) to recover the corresponding RX pulses.

When the AFE 600 is implemented in a Doppler radar system, the transmitter 610 may receive a digital bitstream corresponding to a series of TX pulses to be transmitted, in succession, at a predetermined (e.g., target) frequency. Accordingly, the receiver 620 may receive a corresponding series of reflected pulses (e.g., to be converted to RX pulses) from one or more objects in the path of the transmitted pulses. As described above, a processing system coupled to the AFE 600 (such as the velocity detection circuitry 115 of FIGS. 1A and 1B) may determine the velocity of the objects based at least in part on a frequency of the RX pulses. More specifically, the velocity of an object may be determined by an amount of Doppler shift detected in the frequency of the RX pulses reflected by that object (e.g., relative to the frequency of the TX pulses).

It is noted, in the example of FIG. 6, that the DACs 614(1)-614(n) and the ADCs 624(1)-624(n) are coupled to receive the same TX/RX CLK. More specifically, the TX/RX CLK is provided by a clock generator 630 that is shared between the transmitter 610 and the receiver 620. In some implementations, the clock generator 630 may be an example embodiment of the clock generator circuit 300 of FIG. 3. By distributing the TX/RX CLK produced by the same clock generator 630 to the transmitter 610 and the receiver 620, the sampling times (including phase noise) of the DACs 614(1)-614(n) are matched to the sampling times of the ADCs 624(1)-624(n). As a result, the phase noise in the in the ADCs 624(1)-624(n) will effectively cancel out the phase noise in the DACs 614(1)-614(n), thus mitigating any variations in the frequency of the transmitted and/or reflected pulses.

Figure 7:
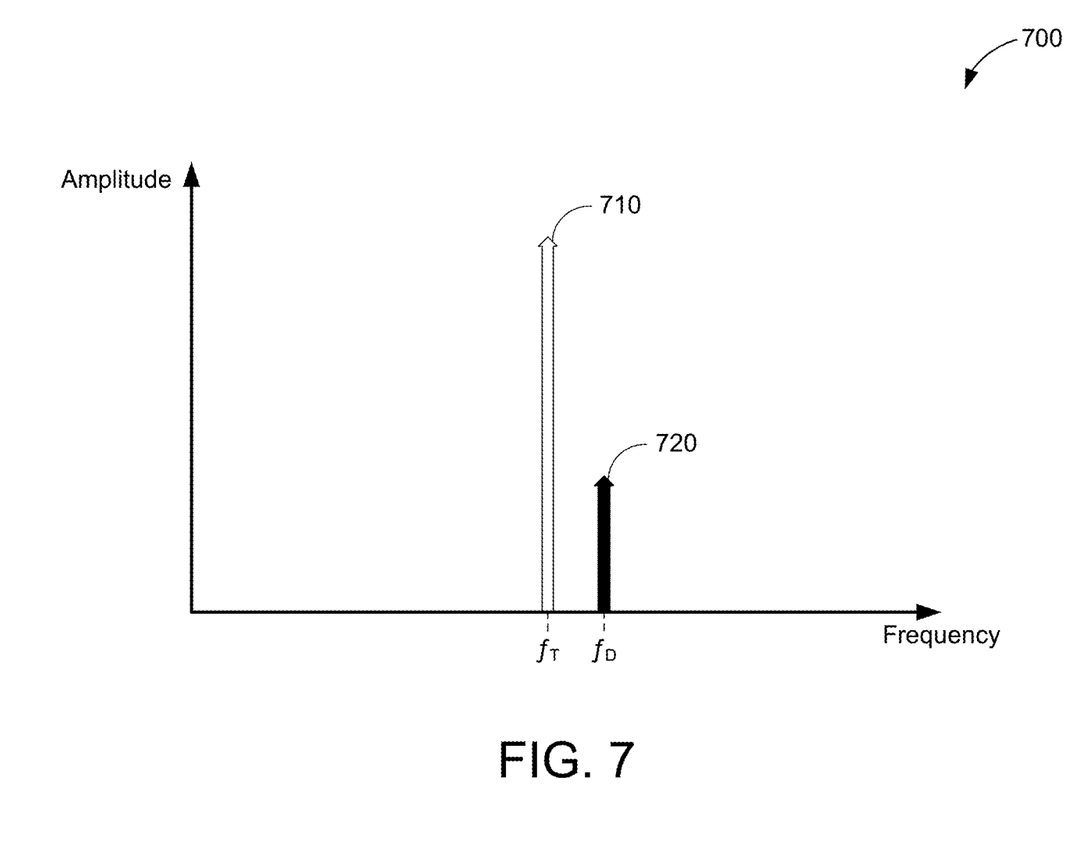
FIG. 7 is a frequency diagram depicting an example frequency-domain representation of a sequence of reflected pulses that may be received by a phase-matched Doppler radar AFE.

FIG. 7 is a frequency diagram 700 depicting an example frequency-domain representation of a sequence of reflected pulses that may be received by a phase-matched Doppler radar AFE. With reference for example to FIGS. 1A and 1B, the frequency diagram 700 may depict the frequencies of reflected pulses 114 and 116 from the first object 101 and the second object 102, respectively. More specifically, the frequency diagram 700 may depict the frequencies of the reflected pulses 114 and 116 as perceived by a phase-matched Doppler radar AFE such as the AFE 600 of FIG. 6.

In the example of FIG. 7, the frequencies of the reflected pulses are generally distributed into two frequency bins 710 and 720. The first frequency bin 710 is centered at the target frequency $f_T$ (e.g., the frequency at which the radar pulses 112 are transmitted by the radar system 110) and the second frequency bin 720 is centered at a Doppler frequency $f_D$ that is slightly higher than the target frequency $f_T$. As described above, the first object 101 may be a moving object and the second object 102 may be stationary. Thus, the first frequency bin 710 may include the reflected pulses 116 from the second object 102 and the second frequency bin 720 may include the reflected pulses 114 from the first object 101.

Phase noise in the TX CLK may cause variations in the frequency of the transmitted pulses 112, thus causing variations in the frequencies of the reflected pulses 114 and 116. With reference for example to FIG. 5, the variations in the frequency of the reflected pulses 116 from the stationary object 102 are depicted by a skirt 501 around the first frequency bin 510 and the variations in the frequency of the reflected pulses 114 from the moving object 101 are depicted by a skirt 502 around the second frequency bin 520. However, because the phases of the RX CLK (e.g., the TX/RX CLK in the receiver 620) are correlated or matched with the phases of the TX CLK (e.g., the TX/RX CLK in the transmitter 610), the AFE 600 does not perceive the frequency variations in the reflected pulses 114 and 116 attributed to phase noise in the TX CLK. Therefore, the frequency diagram 700 does not include the skirts 501 or 502 (e.g., phase noise) depicted in the frequency diagram 500 of FIG. 5.

In the example of FIG. 7, the energy in the reflected pulses 116 from the stationary object 102 (e.g., in the first frequency bin 701) is separate and distinct from the energy in the reflected pulses 114 from the moving object 101 (e.g., in the second frequency bin 702). Therefore, the phase-matched Doppler radar system can clearly identify the Doppler frequency $f_D$ and/or the amount of Doppler shift (e.g., $|f_T-f_D|$) in the reflected pulses 114 received from the moving object 101. Moreover, the phase-matched Doppler radar system can more accurately determine the velocity of the moving object 101 based, at least in part, on the Doppler frequency $f_D$.

Figure 8:
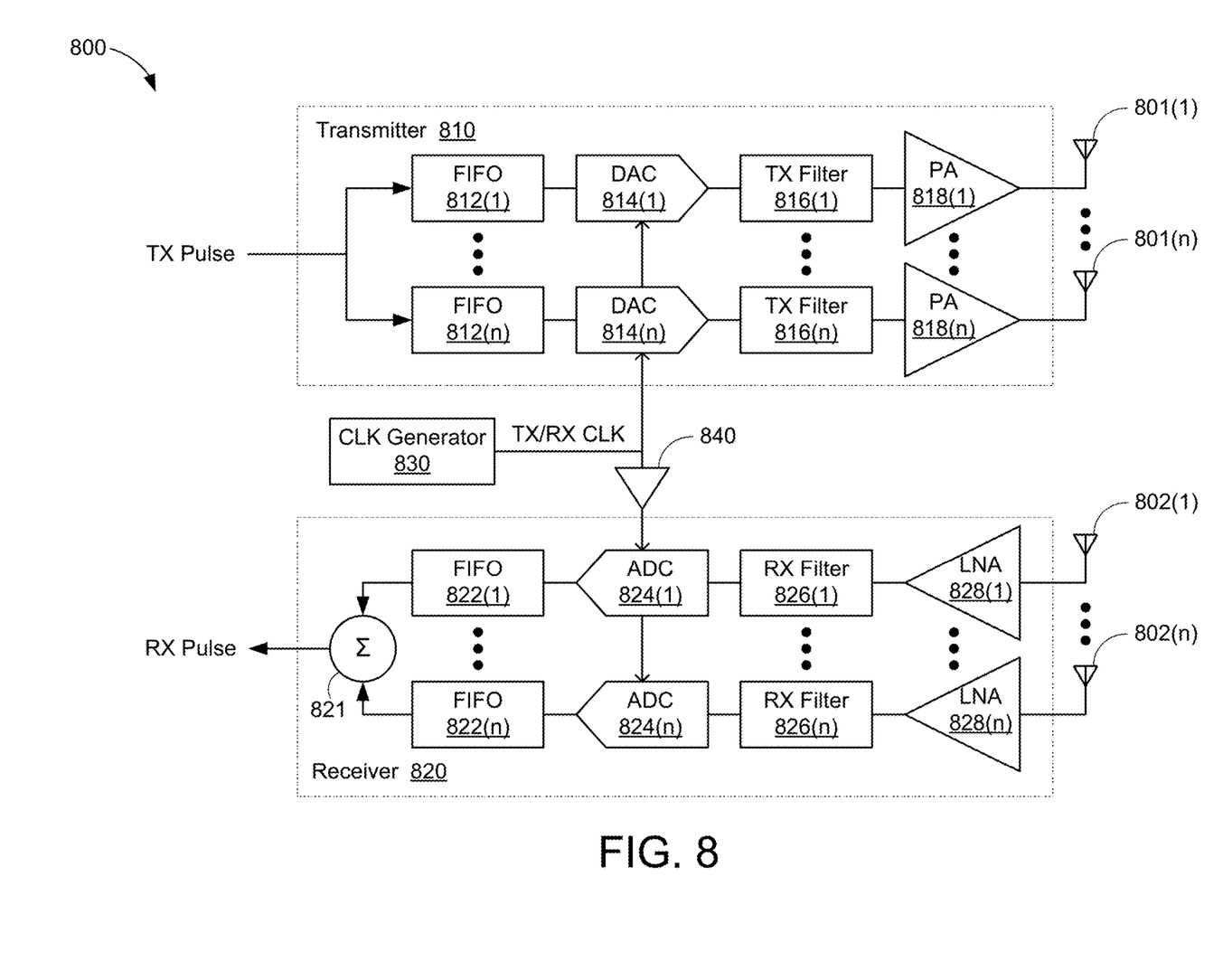
FIG. 8 is a block diagram of another phase-matched Doppler radar AFE, in accordance with some embodiments.

FIG. 8 is a block diagram of another phase-matched Doppler radar AFE 800, in accordance with some embodiments. The AFE 800 may be implemented in a Doppler radar system, such as the radar system 110 of FIG. 1, to transmit and receive radar pulses that may be used to detect a speed or velocity of objects in the surrounding environment. More specifically, the AFE 800 may be an example embodiment of the AFE 200 of FIG. 2. The AFE 800 includes a transmitter 810 to transmit the radar pulses and a receiver 820 to receive reflections of the radar pulses. In some embodiments, the AFE 800 is configured to transmit and receive the radar pulses using digital beamforming techniques.

The transmitter 810 receives a digital representation of a series of TX pulses and transmits the TX pulses, via a plurality of TX antennas 801(1)-801(n), in a target direction (e.g., in a direction of a target object). In some implementations, the transmitter 810 may include a plurality of FIFOs 812(1)-812(n), a DACs 814(1)-814(n), a plurality of TX filters 816(1)-816(n), and a plurality of PAs 818(1)-818(n) each coupled to a respective one of the TX antennas 801(1)-801(n). Each of the FIFOs 812(1)-812(n) may apply a respective phase shift (e.g., digital delay) to the TX pulses so that the analog pulses transmitted by the antennas 801(1)-801(n) will be steered or focused in the target direction. The DACs 814(1)-814(n) may convert the digital outputs of the FIFOs 812(1)-812(n), respectively, to a plurality of phase-shifted analog pulses which are filtered by the TX filters 816(1)-816(n). The phase-shifted analog pulses are amplified by the PAs 818(1)-818(n) and subsequently transmitted via the TX antennas 801(1)-801(n).

The receiver 820 may receive reflections of the transmitted pulses (e.g., transmitted by the transmitter 810), via a plurality of RX antennas 802(1)-802(n), and recovers a digital representation of the reflected (RX) pulses. In the example of FIG. 8, the RX antennas 802(1)-802(n) are shown to be separate from the TX antennas 801(1)-801(n). However, in some embodiments, the transmitter 810 and receiver 820 may share one or more antennas, for example, via antenna switching circuitry (not shown for simplicity). In some implementations, the transmitter 810 may include a plurality of FIFO buffers 822(1)-822(n), a plurality of ADCs 824(1)-824(n), a plurality of RX filters 826(1)-826(n), and a plurality of LNAs 828(1)-828(n) each coupled to a respective one of the RX antennas 802(1)-802(n). The LNAs 828(1)-828(n) may amplify the analog pulses received via the RX antennas 802(1)-802(n), respectively. The amplified pulses may be filtered by the RX filters 826(1)-826(n) and converted to digital format via the ADCs 824(1)-824(n). Each of the FIFOs 822(1)-822(n) may apply a respective phase shift (e.g., digital delay) to the outputs of the ADCs 824(1)-824(n), respectively, to align the phases of the digital pulses (e.g., to counter the effects of beamforming). The phase-aligned digital pulses may then be combined or summed together (e.g., via a summation circuit 821) to recover the corresponding RX pulses.

When the AFE 800 is implemented in a Doppler radar system, the transmitter 810 may receive a digital bitstream corresponding to a series of TX pulses to be transmitted, in succession, at a predetermined (e.g., target) frequency. Accordingly, the receiver 820 may receive a corresponding series of reflected pulses (e.g., to be converted to RX pulses) from one or more objects in the path of the transmitted pulses. As described above, a processing system coupled to the AFE 800 (such as the velocity detection circuitry 115 of FIGS. 1A and 1B) may determine the velocity of the objects based at least in part on a frequency of the RX pulses. More specifically, the velocity of an object may be determined by an amount of Doppler shift detected in the frequency of the RX pulses reflected by that object (e.g., relative to the frequency of the TX pulses).

It is noted, in the example of FIG. 8, that the DACs 814(1)-814(n) and the ADCs 824(1)-824(n) are coupled to receive the same TX/RX CLK. More specifically, the TX/RX CLK is provided by a clock generator 830 that is shared between the transmitter 810 and the receiver 820. In some implementations, the clock generator 830 may be an example embodiment of the clock generator circuit 300 of FIG. 3. However, by distributing the TX/RX CLK produced by the same clock generator 830 to the transmitter 810 and the receiver 820, the sampling times (including phase noise) of the DACs 814(1)-814(n) are matched to the sampling times of the ADCs 824(1)-824(n). As a result, the phase noise in the in the ADCs 824(1)-824(n) will effectively cancel out the phase noise in the DACs 814(1)-814(n), thus mitigating any variations in the frequency of the transmitted and/or reflected pulses.

In some embodiments, the receiver 820 may receive a delayed version of the TX/RX CLK provided to the transmitter 810. For example, a delay element 840 may be coupled between the output of the clock generator 830 and the clock inputs of the ADCs 824(1)-824(n). The amount of delay applied by the delay element 840 may be based, at least in part, on a round-trip time (RTT) for transmitted pulses to be reflected and received by the AFE 800. As noted with respect to FIG. 4, there is typically some propagation delay between the time at which a radar pulse 401 is transmitted via the TX antennas 801(1)-801(n) and the time at which a reflection of that radar pulse 402 arrives at the RX antennas 802(1)-802(n). The RTT of a radar pulse generally depends on the distance between the radar system and a reflecting object. For example, pulses reflecting off objects that are further away from the radar system will have a longer RTT than pulses reflecting off objects that are closer to the radar system.

Since radar pulses effectively propagate at the speed of light, the RTT of radar pulses reflected by objects relatively close to the radar system may be negligible. Thus, in some embodiments, the delay element 840 may apply no delay to the TX/RX CLK provided to the receiver 820 when the AFE 800 (or the corresponding radar system) is configured to detect the velocity of objects in relatively close proximity of the radar system. However, when the AFE 800 is configured to detect the velocity of objects further from the radar system, the delay element 840 may be configured to delay the TX/RX CLK provided to the receiver 820 by an amount commensurate with the range of the target object(s) so that the sampling times (including phase noise) of the radar pulses 401 will coincide more precisely with the sampling times of the reflected pulses 402. This may allow the radar system to more accurately mitigate frequency variations in the radar pulses 401 and/or phase noise in the TX CLK.

Figure 9:
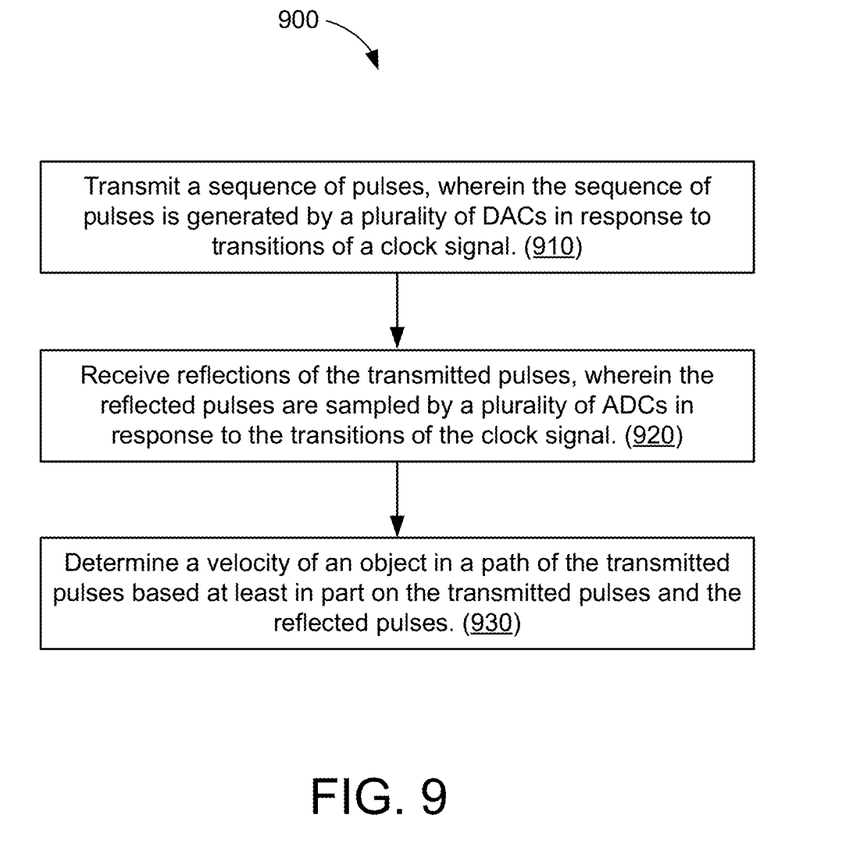
FIG. 9 is an illustrative flow chart depicting an example operation of a phase-matched Doppler radar system, in accordance with some embodiments.

FIG. 9 is an illustrative flow chart depicting an example operation 900 of a phase-matched Doppler radar system, in accordance with some embodiments. With reference for example to FIGS. 6 and 8, the example operation 900 may be performed by a radar system coupled to any of the phase-matched Doppler radar AFEs 600 and/or 800 described herein. More specifically, the example operation 900 may allow the radar system to mitigate phase noise in the TX CLK by correlating or synchronizing the TX CLK and the RX CLK.

The radar system may transmit a sequence of pulses, wherein the sequence of pulses is generated by a plurality of DACs in response to transitions of a clock signal (910). With reference for example to FIG. 6, the transmitter 610 may receive a digital bitstream corresponding to a series of TX pulses to be transmitted, in succession, at a predetermined (e.g., target) frequency. More specifically, each of the FIFOs 612(1)-612(n) may apply a respective phase shift (e.g., digital delay) to the TX pulses so that the analog pulses transmitted by the antennas 601(1)-601(n) will be steered or focused in the target direction. The DACs 614(1)-614(n) may convert the digital outputs of the FIFOs 612(1)-612(n), respectively, to a plurality of phase-shifted analog pulses. In some embodiments, the DACs 614(1)-614(n) sample or generate analog pulses in response to a TX/RX CLK generated by a clock generator 630. For example, each of the DACs 614(1)-614(n) may update the amplitude of its analog output (e.g., corresponding to the TX pulses) with each transition of the TX/RX CLK (e.g., from low-to-high or high-to-low, or both).

The radar system may further receive reflections of the transmitted pulses, wherein the reflected pulses are sampled by a plurality of ADCs in response to the transitions of the clock signal (920). With reference for example to FIG. 6, the receiver 620 may receive a corresponding series of reflected pulses (e.g., to be converted to RX pulses) from one or more objects in the path of the transmitted pulses. More specifically, the received pulses may be converted to digital format via the ADCs 624(1)-624(n). Each of the FIFOs 622(1)-622(n) may apply a respective phase shift (e.g., digital delay) to the outputs of the ADCs 624(1)-624(n), respectively, to align the phases of the digital pulses (e.g., to counter the effects of beamforming). The phase-aligned digital pulses may then be combined or summed together (e.g., via a summation circuit 621) to recover the corresponding RX pulses. In some embodiments, the ADCs 224(1)-224(n) may sample the received pulses in response to the TX/RX CLK generated by the same clock generator 630. For example, each of the ADCs 624(1)-624(n) may update the amplitude of its digital output (e.g., corresponding to the RX pulses) with each transition of the TX/RX CLK (e.g., from low-to-high or high-to-low, or both).

The radar system may then determine a velocity of an object in a path of the transmitted pulses based at least in part on the transmitted pulses and the reflected pulses (930). As described above with respect to FIGS. 1A and 1B, a Doppler radar system may determine the velocity of the objects based at least in part on a frequency of the RX pulses. More specifically, the velocity of an object may be determined by an amount of Doppler shift detected in the frequency of the RX pulses reflected by that object (e.g., relative to the frequency of the TX pulses). Thus, to accurately detect such Doppler shifts, the RX pulses should be correlated (e.g., matched in phase) with the TX pulses. By distributing the TX/RX CLK produced by the same clock generator 630 to the transmitter 610 and the receiver 620, the sampling times (including phase noise) of the DACs 614(1)-614(n) are matched to the sampling times of the ADCs 624(1)-624(n). As a result, the phase noise in the in the ADCs 624(1)-624(n) will effectively cancel out the phase noise in the DACs 614(1)-614(n), thus mitigating any variations in the frequency of the transmitted and/or reflected pulses.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM latch, flash latch, ROM latch, EPROM latch, EEPROM latch, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A radar system, comprising:
    a transmitter configured to transmit a sequence of pulses, the transmitter including a plurality of digital-to-analog converters (DACs) to generate the sequence of pulses in response to a clock signal;
    a receiver configured to receive a plurality of reflected pulses representing reflections of the pulses by at least a first object and a second object, the receiver including a plurality of analog-to-digital converters (ADCs) to sample the reflected pulses in response to the clock signal, wherein phase noise in the clock signal causes at least some of the pulses reflected by the second object to overlap in frequency with the pulses reflected by the first object; and
    velocity detection circuitry configured to:
        detect a Doppler shift between a frequency of the transmitted pulses and a frequency of the reflected pulses so that the pulses reflected by the second object are filtered from the pulses reflected by the first object; and
        determine a velocity of the first object based at least in part on the detected Doppler shift.

2. The radar system of claim 1, wherein the ADCs are locked in phase with the DACs.

3. The radar system of claim 1, wherein at least one of the DACs is configured to generate a first pulse in response to a first transition of the clock signal, and wherein at least one of the ADCs is configured to sample a reflection of the first pulse in response to the first transition of the clock signal.

4. The radar system of claim 1, wherein the phase noise in the clock signal causes variations in the frequency of the transmitted pulses and corresponding variations in the frequency of the reflected pulses, and wherein the receiver matches the variations in the frequency of the reflected pulses to the variations in the frequency of the transmitted pulses when sampling the reflected pulses.

5. The radar system of claim 1, wherein the first object is a moving object and the second object is stationary.

6. The radar system of claim 1, further comprising:
    a clock generator circuit to generate the clock signal provided to the plurality of DACs and the plurality of ADCs, wherein the phase noise corresponds to close-in phase noise produced by one or more components of the clock generator circuit.

7. The radar system of claim 1, further comprising:
    a delay element to delay the clock signal provided to the ADCs, wherein an amount of delay implemented by the delay element is based at least in part on a round-trip time between the transmission of a pulse and the reception of a reflection of the pulse.

8. The radar system of claim 1, wherein the transmitter and the receiver are configured to use digital beamforming techniques to transmit the sequence of pulses and receive the reflections of the transmitted pulses, respectively.

9. A method of operating a radar system, comprising:
    generating a sequence of pulses via a plurality of digital-to-analog converters (DACs) in response to a clock signal;
    transmitting the sequence of pulses;
    sampling a plurality of reflected pulses via a plurality of analog-to-digital converters (ADCs) in response to the clock signal, the plurality of reflected pulses representing reflections of the pulses by at least a first object and a second object, wherein phase noise in the clock signal causes at least some of the pulses reflected by the second object to overlap in frequency with the pulses reflected by the first object;
    detecting a Doppler shift between a frequency of the transmitted pulses and a frequency of the reflected pulses so that the pulses reflected by the second object are filtered from the pulses reflected by the first object; and
    determining a velocity of the first object based at least in part on the detected Doppler shift.

10. The method of claim 9, wherein the ADCs are locked in phase with the DACs.

11. The method of claim 9, wherein at least one of the DACs is configured to generate a first pulse in response to a first transition of the clock signal, and wherein at least one of the ADCs is configured to sample a reflection of the first pulse in response to the first transition of the clock signal.

12. The method of claim 9, wherein phase noise in the clock signal causes variations in the frequency of the transmitted pulses and corresponding variations in the frequency of the reflected pulses, and wherein the sampling comprises:
   matching the variations in the frequency of the reflected pulses to the variations in the frequency of the transmitted pulses.

13. The method of claim 9, wherein the first object is a moving object and the second object is stationary.

14. The method of claim 9, further comprising:
   generating the clock signal via a clock generator circuit, wherein the phase noise corresponds to close-in phase noise produced by one or more components of the clock generator circuit.

15. The method of claim 9, further comprising:
   delaying the clock signal provided to the ADCs, wherein an amount of delay applied to the clock signal is based at least in part on a round-trip time between the transmission of a pulse and the reception of a reflection of the pulse.

16. The method of claim 9, wherein the sequence of pulses and the reflections are transmitted and received, respectively, using digital beamforming techniques.

* * * * *